2,963,408
RECOVERY OF ORTHO-CRESOL

Warn D. Robinson and James D. Sullivan, Webster Groves, Mo., assignors to Monsanto Chemical Company, St. Louis, Mo., a corporation of Delaware No Drawing. Filed Nov. 1, 1956, Ser. No. 619,674

4 Claims. (Cl. 202—46)

This invention relates to the purification of organic chemical compounds and more specifically pertains to the removal by steam distillation of an organic chemical compound from a mixture of organic chemical compounds wherein the organic chemical compound to be removed is volatile with steam and the remainder of the mixture is not volatile with steam.

It is known that unreacted phenols and anilines can be removed by ordinary steam distillation from mixtures wherein the phenol or aniline resulting from the use of these aromatic compounds is a reactant or a reaction wherein these compounds are a product or by-product. However, such ordinary or straight steam distillation requires the use of large quantities of steam. The same problem occurs when other organic compounds present in admixture as unreacted starting materials or as reaction by-products are the organic compounds of relatively lower volatility. For at reasonable temperatures excessively large quantities of steam are consumed when removing the small amount of by-product or unreacted reactant. While steam distillation constitutes an economical means for the removal of such unreacted starting materials or reaction products, the drawback provides an area for improvement in that less steam might be used to accomplish the desired result.

It has now been discovered that an organic compound either as unreacted starting material or reaction by-product can be recovered by an improved steam distillation process from the reaction mixture where said compound is volatile with steam and is, of course, more volatile than any of the other components in the mixture. This improved steam distillation process comprising adding to the mixture an organic solvent for the organic compound to be removed, which solvent is water immiscible and is also volatile with steam, adding steam to the resulting mixture and condensing the vapors generated thereby. A more preferred embodiment of the process of this invention comprises heating the mixture to be steam distilled to a temperature above the condensation temperature of the steam at the pressure at which the steam distillation is to be carried out, adding the steam and solvent substantially simultaneously and condensing the vapors generated thereby. The condensate from the process of this invention separates into a water layer and an organic solvent layer. The water layer can be discarded and the solution of the recovered reactant or by-product can be readily separated into its components by simple distillation. The separation of the aqueous and solvent layers can be accomplished on a continuous basis and the solvent layer passed to distillation equipment to remove the solvent which can then be fed back to the steam distillation process. For most efficient use of the solvent it is added substantially continuously with the steam below the surface of the mixture being steam distilled. An obvious means of accomplishing the same result is to add a large proportion of solvent at the beginning.

The optimum proportion of organic solvent to be used in the process of this invention as is readily understood by those skilled in the art will depend on the solvent and also depend somewhat on the degree of purification desired. Obviously large proportions of a water immiscible solvent rather volatile with steam will not be detrimental unless, of course, a constant boiling mixture is formed which carries less of the organic material to be removed than would be carried by steam alone. On the other hand, too little solvent might not offer the savings in steam which will justify the use of the solvent.

It has been found that a relatively small amount of solvent can be used to remove over 80% of the unreacted material or the by-product according to the purification process of this invention. The process of this invention and the advantages thereof are illustrated in the examples which follow.

Example 1

To suitable equipment for steam distillation there is charged a reaction mixture resulting from the condensation of 0.4 mole of orthocresol with 0.44 mole monochloroacetic acid containing 0.07 mole of unreacted orthocresol. To this mixture there is added 33 parts by weight of monochlorobenzene. The resulting mixture is heated to about 100° C. and steam added through a sparger at the bottom of the mixture. The vapors generated thereby are passed into a condenser and the resulting condensate is collected. All of the monochlorobenzene is collected in the first 50 cc. of condensate. The water is removed from the condensate and it is found that the monochlorobenzene contains 3.3 grams of orthocresol. The next 200 cc. of condensate collected contain 2.5 grams of orthocresol. The next 100 cc. of condensate contain 0.5 gram of orthocresol and the fourth 100 cc. of condensate contain 0.2 gram of orthocresol. There is no detectable orthocresol in the next 100 cc. of condensate.

The orthocresol appearing in the condensate, which is generally monochlorobenzene, and in the first 200 cc. of water condensate represents 88.5% of the orthocresol recovered.

In contrast to this, when steam alone is used to remove the orthocresol from the reaction mixture described above, only about one-half the unreacted orthocresol is recovered in the first 400 cc. of condensate.

Example II

To a reaction mixture containing cresoxy acetic acid and unreacted orthocresol resulting from the condensation of 0.4 mole orthocresol with 0.44 mole monochloroacetic acid and containing about 8 grams of unreacted cresol there is added 50 cc. of monochlorobenzene. The resulting mixture is heated to about 100° C. and then steam distilled. In the first 250 cc. of condensate, of which 50 cc. represent the monochlorobenzene and the remainder being water, there is 7.24 grams of unreacted orthocresol representing a recovery of about 90% of the total amount of unreacted orthocresol.

From the above examples it is apparent that the process of this invention results in a savings of 200% or more of the steam and time generally required in a steam distillation process when used for the removal of unreacted materials or a reaction by-product. The process of this invention is not limited to the recovery of orthocresol in admixture with cresoxy acetic acid, but rather is useful in recovery of other organic compounds from admixture with higher boiling products. For example, phenol, carvacrol, ethyl phenol, among other phenols, can be recovered and aniline, toluidine, xylidine can be recovered from reaction mixtures resulting from the condensation of these compounds with other organic compounds to produce a higher molecular weight, higher boiling product. As the water immiscible solvent of the process of this invention there can be used mono-chlorobenzene, benzene, ethyl benzene, toluene, xylene, tetrachloroethane, dichloroethylene and the like.

What is claimed is:

1. The process for recovering o-cresol from a reaction mixture resulting from a reaction involving o-cresol wherein said reaction mixture the constituents other than o-cresol are substantially non-volatile with steam by a steam distillation process of said reaction mixture, the steps comprising: substantially simultaneously adding to said reaction mixture steam and a solvent for o-cresol said solvent being immiscible with water, volatile with steam and having a lower boiling point than o-cresol, and condensing the resulting vapors.

2. The process for recovering o-cresol from a reaction mixture wherein said reaction mixture the constituents other than o-cresole are substantially non-volatile with steam by a steam distillation of said reaction mixture, the steps comprising: adding to said reaction mixture a solvent for o-cresol, said solvent being immiscible with water, volatile with steam and having a lower boiling point than o-cresol, adding steam to the resulting composition, and condensing the resulting vapors.

3. The process for removing and recovering o-cresol from a reaction mixture comprising a minor proportion of o-cresol and a major proportion of cresoxy acetic acid by steam distillation of said reaction mixture, the steps comprising: substantially simultaneously adding to said reaction mixture steam and mono-chlorobenzene and recovering the resulting vapor.

4. The process for recovering o-cresol from a reaction mixture wherein said reaction mixture the constituents other than o-cresol are substantially non-volatile with steam by a steam distillation of said reaction mixture, the steps comprising: adding to said reaction mixture mono-chlorobenzene, adding steam to the resulting composition, and condensing the resulting vapors.

References Cited in the file of this patent

UNITED STATES PATENTS

| 1,416,206 | Huff | May 16, 1922 |
| 1,424,138 | Bailey et al. | July 25, 1922 |
| 2,085,287 | Bailey | June 29, 1937 |
| 2,177,183 | Kraft et al. | Oct. 24, 1939 |
| 2,231,241 | Bailey | Feb. 11, 1941 |
| 2,288,126 | Dunn et al. | June 30, 1942 |
| 2,815,385 | Guest et al. | Dec. 3, 1957 |

OTHER REFERENCES

A. Weissberger: "Distillation," published 1951 by Interscience Publishers, Ltd., London, pages 374–378 relied upon.